UNITED STATES PATENT OFFICE 2,236,057

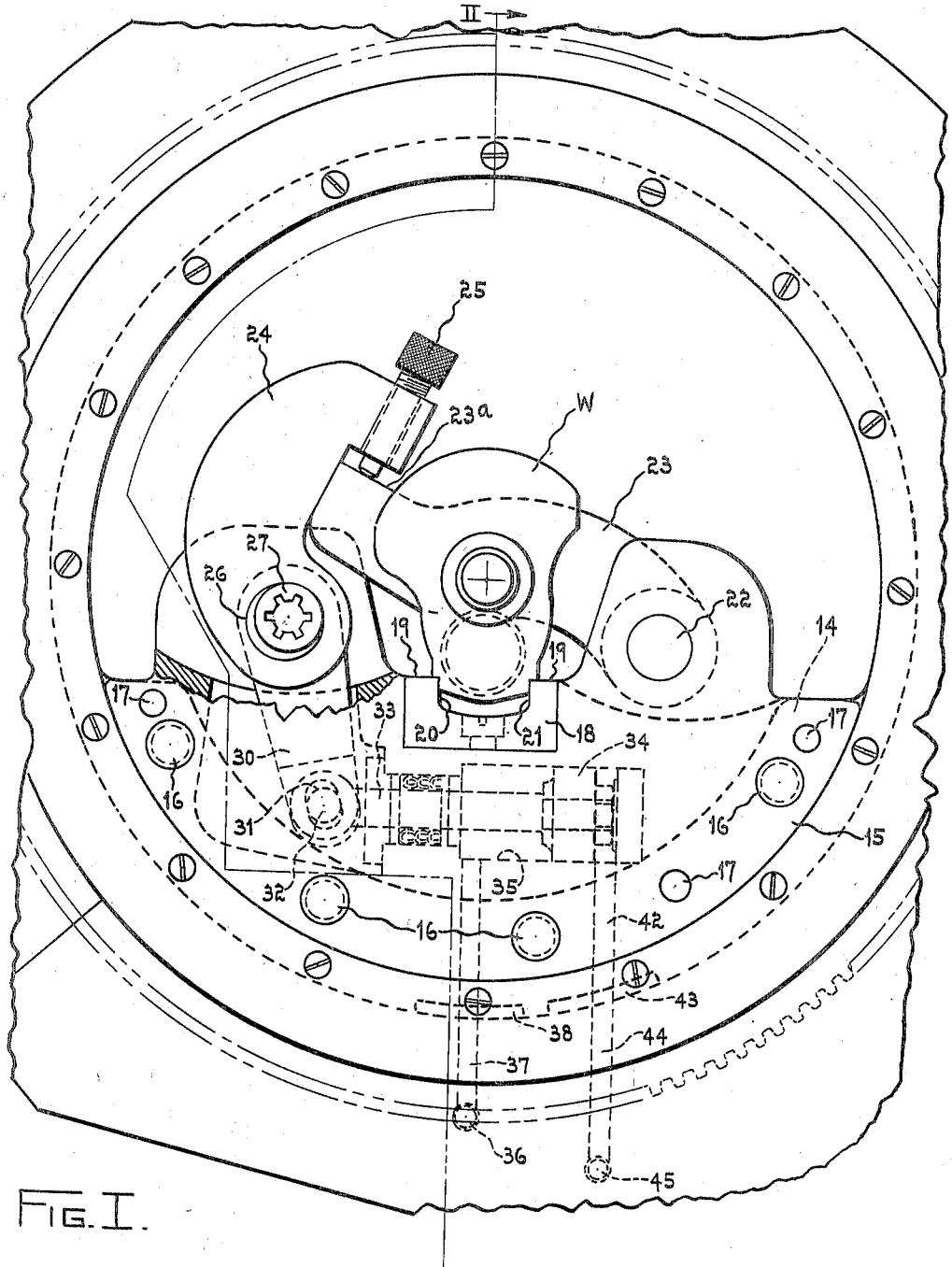
Fig. I.

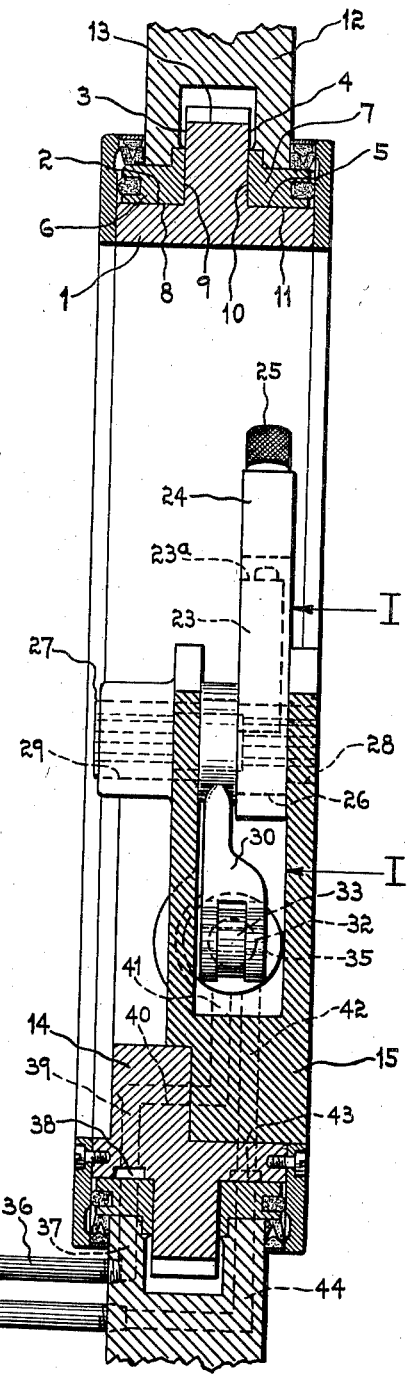
Fig. II.

POWER CENTER DRIVE CHUCK

William F. Groene and Harold J. Siekmann, Cincinnati, Ohio, assignors to The R. K. Le Blond Machine Tool Company, Cincinnati, Ohio, a corporation of Delaware Application October 20, 1939, Serial No. 300,414

10 Claims. (Cl. 82—40)

This invention pertains to power operated chucking devices for lathes and is particularly related to the power operation of center drive chucks for center drive crankshaft lathes.

The problem of operating a power chucking device on a rotating work spindle is rendered distinctly difficult in cases where this work spindle constitutes a ring gear of a center drive lathe. In such an arrangement, where the chucking device is mounted inside of such a rotary ring gear, great difficulty is encountered in properly applying a power medium to this rotating ring gear by which the chucking device in it may be actuated for clamping the work by power. One of the chief difficulties of this arrangement is that side faces of the center drive ring gear must be clear and free of any apparatus for applying the power to the ring gear chucking device because this apparatus would otherwise interfere with the cutting tools of the feeding apparatus of the lathe, this being particularly true in center drive line bearing crankshaft lathes wherein bearings are cut on a work piece in the center drive chuck closely adjacent to each side of the ring gears so that the tools and their feed mechanism lie closely adjacent these faces of the ring gear. This precludes the application of any power conducting medium to the ring gear chucking mechanism on these faces. It has therefore been necessary to provide other means of applying the power to the chucking device in the ring gear in such a way that it will not interfere with the operation of the cutting tools closely adjacent each side of the ring gear chucking device.

It is therefore an object of this invention to provide an unique arrangement whereby power may be applied to a rotary ring gear chucking device of a center drive lathe in such a way as to be fully self-contained within the width of the center drive ring gear so as not to interfere in any way with the cutting devices of the lathe in which the power center drive chucking device is utilized.

Another object of this invention is to provide means for applying fluid pressure power to a power operated chucking device in a center drive ring gear which may be transmitted to the ring gear through the bearing surfaces upon which it rotates in the frame of the lathe.

Another object of this invention is to provide means for applying power to a chucking device in a rotary center drive ring gear of a center drive lathe at the time the center drive ring gear is brought to rest when loading and unloading work in the chuck and to provide in conjunction with this apparatus means for automatically maintaining the chuck in clamped position when the ring gear is being rotated during the cutting cycle.

Further features and advantages of this invention will appear in the detailed description of the drawings in which:

Fig. I is an axial view of a center drive ring gear of a center drive lathe in which is carried a power operated chucking device incorporating the features of this invention.

Fig. II is a section through the chucking device and ring gear of Fig. I substantially on the line II—II of Fig. I.

This invention comprises a power operated chuck carried in a center drive ring gear 1 which has bearing surfaces 2, 3, 4 and 5 which are journaled on the bearing bushings 6 and 7, having corresponding mating bearing surfaces 8, 9, 10 and 11 cooperating with the bearing surfaces 2, 3, 4 and 5 of the ring gear 1. These bearing bushings are appropriately fixed in the frame 12 of a center drive lathe. On the ring gear between the surfaces 9 and 10 are cut the usual driving gear teeth 13.

To the integral flange 14 of the ring gear 1 is securely fixed the segmental chuck member 15 by means of suitable screws 16 and pins 17. In this segmental member 15 is fixed a conventional locating block 18, having accurately positioned locating surfaces 19, 20 and 21 for engaging corresponding accurate locating surfaces on the work piece or crankshaft W placed in the chuck in a manner, for example, as illustrated in Patent 2,030,020.

Pivotally mounted on a pin 22 fixed in the segmental member 15, is the clamp bar 23 which is arranged to swing across the work piece W to hold it into engagement with the locating block 18. A latch bar 24, having the adjustable abutment screw 25 engaging the outer end 23a of the latch bar 23 is journaled on the eccentric portion 26 of the clamping eccentric 27 which is journaled in suitable bearings 28 and 29 in the segmental member 15 so that rotation of this eccentric clamping member 27 causes the clamp bar 24 to be drawn down with its abutment screw 25 engaging the surface 23a of the clamp bar 23 for securely forcing the work W against the locating block 18.

This clamping eccentric 27 is actuated by power by means of its integral lever 30 which extends downwardly and has a slotted end portion 31 in which operates a pin 32 fixed in the end of the cylinder rod 33, this cylinder rod having a piston 34 operating in the cylinder 35 formed in the segmental member 15 so that the reciprocation of the piston 34 in this cylinder 35 effects rocking movement of the eccentric clamping member 27 for tightening or loosening the latch bar 24 on the clamp bar 23. Fluid pressure for reciprocating this piston 34 in the cylinder 35 is derived from a suitable source of fluid pressure and enters the pipe line 36 through the passageway 37 in the frame 12 of the machine and through the bearing bushing 6 and into the elongated peripheral slot 38 formed in the bearing diameter 2 of the ring gear 1. This elongated slot 38 is connected by suitable fluid pressure conduit means 39, 40 and 41 to the rod end of the cylinder 35. The other end of the cylinder 35 is connected by means of a conduit 42 through the segmental member 15 and the ring gear 1 to the elongated slot 43 in the periphery of the ring gear in the bearing surface 5 of the ring gear 1. This elongated slot is connected to the source of fluid pressure through lines 44 and 45.

When fluid pressure is applied through the line 36 to the rod end of the cylinder 35, the piston will be moved to the right, Fig. I, to cause the eccentric clamping means 27 to be rocked so as to draw the latch bar 24 downwardly against the clamp bar 23 to thereby clamp the work W securely against the locating block 18 of the chuck. Meanwhile the fluid at the head end of the cylinder 35 will be exhausted through the lines 42, 44 and 45. When fluid pressure is applied in the line 45 so that its pressure will enter the head end of cylinder 35, the piston 34 will be moved to the left, Fig. I so as to loosen the eccentric in the clamping bar 24 to allow it to be swung counterclockwise to permit removal of the clamp bar 23 from the work piece for loading and unloading the work into the chuck.

An interesting feature of this invention is that fluid pressure is applied to actuate the chucking mechanism when the chuck has come to rest at a predetermined position, substantially as shown in Fig. I. During rotation of the chuck however, fluid pressure may not be constantly applied to the chucking device because the elongated slots 38 and 43 do not, except intermittently, line up with the supply and discharge pipe lines 36 and 45. The clamping eccentric 27 is therefore made self-locking so that when it is drawn to the position shown in Fig. I by the piston 34, the chuck will be securely clamped regardless as to whether fluid pressure is applied to the line 36 or not during the turning operation on the work piece W in the chuck. A further unusual feature of this arrangement is that any fluid pressure which may escape around the elongated slots 38 and 43 during the clamping and unclamping operations will serve to assist in the lubrication of the bearing surfaces 8, 9, 10 and 11 of the bearing bushings 6 and 7 and the corresponding bearing surfaces on the ring gear 1. Also, by means of this self-locking eccentric construction a certain amount of leakage between the bearing surface of the ring gear and the bearing bushings in the frame 12 on the lathe will have no effect on the proper functioning of the chuck in gripping the work securely during the turning operation.

Thus by means of this unique arrangement we have provided an efficient means whereby a chucking device of a center drive chuck having a rotary ring gear may be actuated by power to thereby greatly speed up the production of such chucking mechanism and to eliminate effort on the part of the operator in effecting the tight clamping of the chucking mechanism on the work piece W.

Having thus fully set forth and described our invention what we claim as due and desired to secure by united Letters Patent is:

1. In a center drive lathe, a frame, a center drive ring gear rotatably mounted in said frame, a power operated chucking device in said ring gear, and means for applying power for operating said chucking device from a point exterior of said ring gear, said means being restricted within the width of said frame and center drive ring gear.

2. In a center drive lathe, a frame, a center drive ring gear rotatably mounted in said frame, a fluid pressure operated chucking device in said ring gear, and means for applying fluid pressure for operating said chucking device from a point exterior of said ring gear, said means being restricted within the width of said frame and center drive ring gear.

3. In a center drive lathe, a center drive housing frame, a center drive ring gear rotatably mounted in said frame, a power operated chucking device in said ring gear, and means for applying power for operating said chucking device which is confined within the width of said center drive housing frame and said ring gear.

4. In a center drive lathe, a frame, a center drive ring gear rotatably mounted in said frame, a power operated chucking device in said ring gear comprising an eccentric operating means for effecting clamping of said chucking device on a work piece in said lathe, a fluid pressure cylinder for actuating said eccentric means, a source of fluid pressure for operating said cylinder, and means for connecting said fluid pressure through said frame and ring gear to said cylinder.

5. In a center drive lathe, a frame, a center drive ring gear rotatably mounted in said frame, a power operated chucking device in said ring gear comprising an eccentric operating means for effecting clamping of said chucking device on a work piece in said lathe, a fluid pressure cylinder for actuating said eccentric means having a piston and a rod connected to a lever on said eccentric means, a source of fluid pressure, and means for connecting said fluid pressure through said frame and ring gear to said cylinder to one or the other side of said piston to effect rocking of said eccentric means for effecting clamping or unclamping of said chucking device.

6. In a center drive lathe, a frame, a center drive ring gear rotatably mounted in said frame, a power operated chucking device in said ring gear comprising an eccentric operating means for affecting clamping of said chucking device on a work piece in said lathe, a fluid pressure cylinder for actuating said eccentric means having a piston and a rod connected to a lever on said eccentric means, a source of fluid pressure, fluid pressure conducting means in said frame and ring gear connected to said cylinder one side of said piston, fluid pressure conducting means in said frame and ring gear connected to said cylinder on the other side of said piston, and means for connecting said source of fluid pressure to one or the other of said fluid pressure conducting means to effect reciprocation of said piston.

7. In a center drive lathe, a frame, a bearing in said frame, a center drive ring gear journaled in said bearing, a power operated chucking device in said ring gear, a source of power for operating said chucking device, and means for connecting said source of power through said bearing to said ring gear to effect operation of said chucking device.

8. In a center drive lathe, a frame, a bearing in said frame, a center drive ring gear having a peripheral bearing surface journaled in said bearing, a fluid power operated chucking device in said ring gear, a source of fluid pressure, fluid pressure conducting means in said frame and said bearing, connected to said source of fluid pressure, fluid pressure conducting means in said ring gear connected to said chucking device, and means for interconnecting said fluid pressure conducting means when said ring gear is arrested from rotation for loading or unloading work in the chucking device.

9. In a center drive lathe, a frame, a bearing in said frame, a center drive ring gear having a peripheral bearing surface journaled in said bearing, a fluid power operated chucking device in said ring gear, a source of fluid pressure, fluid pressure conducting means in said frame and said bearing, connected to said source of fluid pressure, fluid pressure conducting means in said ring gear connected to said chucking device, and means for interconnecting said fluid pressure conducting means at the bearing surface between said ring gear and said bearing.

10. In a center drive lathe, a frame, a center drive ring gear rotatably mounted in said frame, a power operated chucking device in said ring gear comprising a self-locking operating means for effecting clamping of said chucking device on a work piece in said lathe, a fluid pressure means for actuating said operating means, a source of fluid pressure for operating said fluid pressure means, and means for connecting said source of fluid pressure through said frame and ring gear to said fluid pressure actuating means.

WILLIAM F. GROENE.
HAROLD J. SIEKMANN.